United States Patent
Finkler

(10) Patent No.: US 10,007,690 B2
(45) Date of Patent: Jun. 26, 2018

(54) DATA INGESTION STAGER FOR TIME SERIES DATABASE

(71) Applicant: International Business Machines Corporation, Armonk, NY (US)

(72) Inventor: Ulrich A. Finkler, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 14/497,521

(22) Filed: Sep. 26, 2014

(65) Prior Publication Data

US 2016/0092484 A1    Mar. 31, 2016

(51) Int. Cl.
    *G06F 17/30*    (2006.01)

(52) U.S. Cl.
    CPC .. *G06F 17/30336* (2013.01); *G06F 17/30548* (2013.01); *G06F 17/30569* (2013.01)

(58) Field of Classification Search
    CPC ......... G06F 17/30336; G06F 17/30569; G06F 17/30864
    See application file for complete search history.

(56) References Cited

U.S. PATENT DOCUMENTS

| | | | |
|---|---|---|---|
| 8,271,566 B2 | 9/2012 | Droz et al. | |
| 8,326,836 B1* | 12/2012 | Pike | G06F 17/3087 707/739 |
| 8,744,822 B2 | 6/2014 | Mewes et al. | |
| 9,361,329 B2 | 6/2016 | Chen et al. | |
| 9,519,664 B1* | 12/2016 | Kharatishvili | G06F 17/30321 |
| 9,576,046 B2* | 2/2017 | Bullotta | G06F 17/30864 |
| 2006/0106832 A1* | 5/2006 | Ben-Dyke | G06F 17/30327 |
| 2008/0005062 A1* | 1/2008 | Gupta | G06F 17/30595 |
| 2008/0005135 A1* | 1/2008 | Muthukrishnan | G06F 17/301 |
| 2008/0126349 A1* | 5/2008 | Venkatraman | G06F 17/30067 |
| 2010/0281178 A1* | 11/2010 | Sullivan | H04N 7/24 709/231 |
| 2010/0325132 A1* | 12/2010 | Liu | G06F 17/30516 707/759 |
| 2012/0233107 A1* | 9/2012 | Roesch | G06N 5/025 706/47 |
| 2013/0103657 A1 | 4/2013 | Ikawa et al. | |
| 2014/0172866 A1 | 6/2014 | Lin et al. | |
| 2014/0236889 A1* | 8/2014 | Vasan | H04L 67/1097 707/610 |
| 2015/0052173 A1 | 2/2015 | Leonard et al. | |
| 2016/0021430 A1* | 1/2016 | LaBosco | H04N 21/4398 725/31 |

OTHER PUBLICATIONS

Kasetty et al., "Real-Time Classification of Streaming Sensor Data", 2008 20th IEEE International Conference on Tools with Artificial Intelligence, DOI 10.1109/ICTAI.2008.143, pp. 149-156.

* cited by examiner

*Primary Examiner* — Huawen A Peng
(74) *Attorney, Agent, or Firm* — David B. Woycechowsky

(57) ABSTRACT

A time series data stager that receives input data sets and outputs output data blocks for ingestion into a time series database, with the out data blocks being sent at timings according to a sliding window based on a predetermined time.

18 Claims, 3 Drawing Sheets

DATA INGESTION STAGER FOR TIME SERIES DATABASE

BACKGROUND OF THE INVENTION

The present invention relates generally to the field of time series databases, and more particularly to the process of data ingestion for time series databases.

A time series database (TSDB) is designed to handle "time series data." Time series data generally takes the form of arrays of numbers indexed by time (for example, a datetime or a datetime range). TSDBs impose a model, based around time series data specifically, and this allows TSDBs to better handle time series data. The TSDB allows users to create, enumerate, update and destroy various time series and organize them in some fashion. These series may be: (i) organized hierarchically; and (ii) have companion metadata available with them. A TSDB server often supports a number of basic calculations that work on a series as a whole, such as multiplying, adding, or otherwise combining various time series into a new time series. TSDBs can also generally filter on arbitrary patterns defined by the day of the week, low value filters, high value filters, or even have the values of one series filter another. Some TSDBs also include additional statistical functions targeted to time series data. The process of taking data into a time series database is called "data ingestion," or, more simply, "ingestion."

"Sliding window" is a known technique used in various applications (for example, in data compression, the Data Link Layer (OSI model) and the Transmission Control Protocol (TCP)). A criterion is defined that quantifies the "window," depending on the application. In compression algorithms, the window-defining criteria is typically based on a number of bytes, (for example, the window covers that last 64 kB (kilobytes) that were received or processed). In other known sliding window schemes, the window-defining criterion is based on a time interval (for example, the 2 hours prior to the most current data received). The start of the window, at any given point in time, is the most recent datum in the dimension on which exists the window defined by the window-defining criterion. A sliding window effectively partitions data into two classes: (i) data that are within the window criterion; and (ii) data that already have fallen out of the window criterion. Using the example of a sliding window based on the time of receipt of new data, the "end" of the window will advance because the window has a given temporal length which is defined to start at the time the most recent data received was received. Typically sliding window size is fixed, but it may be possible to have a sliding window that varies in size depending upon operating conditions and the like.

SUMMARY

According to an aspect of the present invention, there is a method, computer program product and/or system that performs the following operations (not necessarily in the following order): (i) receiving, from a client data driver module and by a time series stager module, a plurality of input data sets designed for ingestion into a time series database, with each input data set including payload data and a timestamp related to collection of the payload data; (ii) storing the plurality of input data sets in the time series stager module; (iii) formatting the payload data and time-stamps of the plurality of input data sets as a plurality of output data blocks suitable for ingestion into the time series database; and (iv) outputting, from the time series stager and to the time series database, the plurality of output data blocks at timings according to a sliding time window.

DETAILED DESCRIPTION

Figure 1:
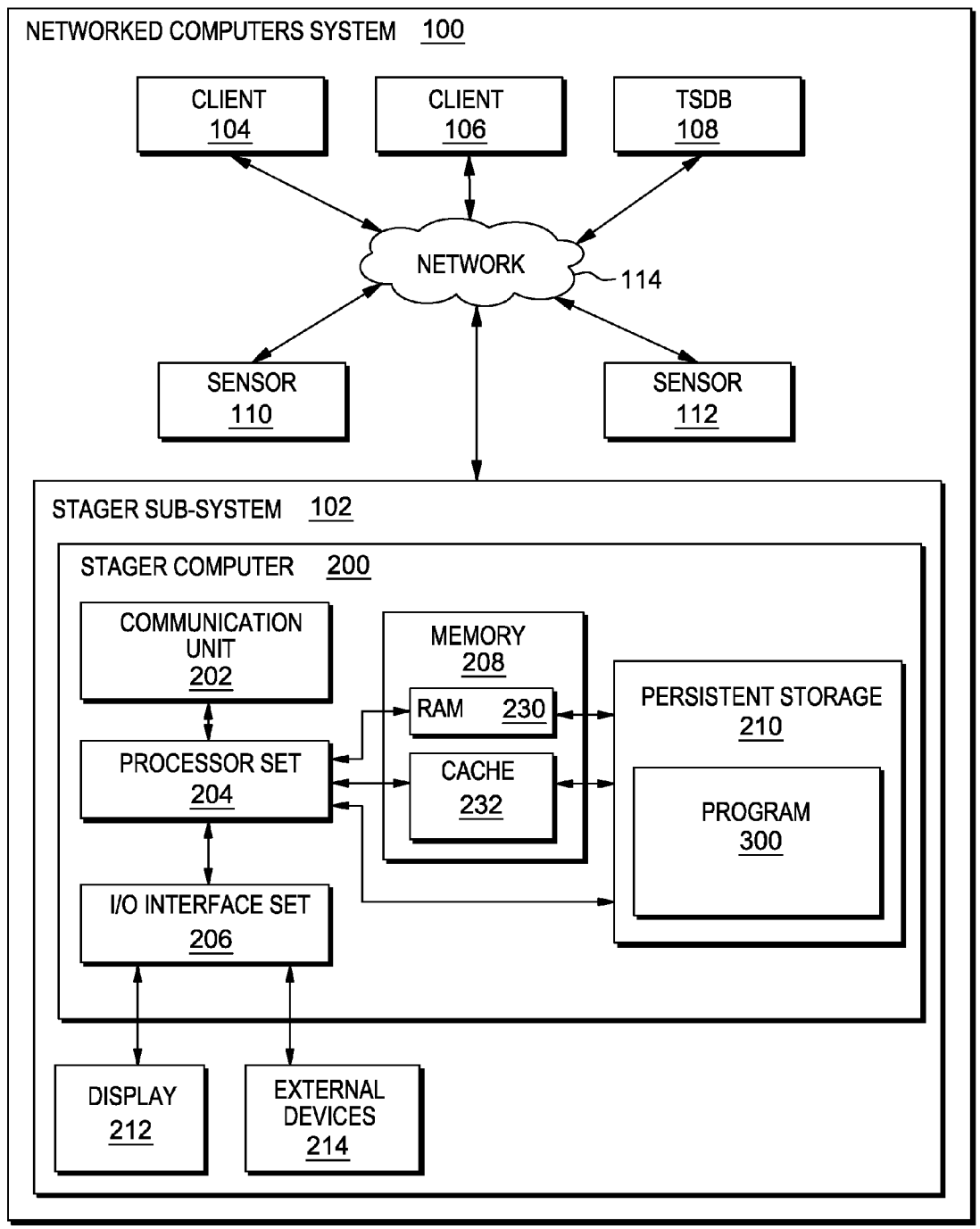
FIG. 1 is a block diagram view of a first embodiment of a system according to the present invention.

Some embodiments of the present invention are directed to a time series data stager that receives input data sets and outputs output data blocks for ingestion into a time series database, with the out data blocks being sent at timings according to a sliding window based on a predetermined time. In some embodiments of the present invention, the data is stored in the time series stager with "in core accelerated indexing" for queries and "ingestion optimization." "In core acceleration" and "ingestion optimization" will be discussed in general terms in the following paragraphs.

As used herein, "in core acceleration" means that at least some operations of the time series stager that would otherwise rely on random access memory (RAM) data storage and/or data access, instead use in core memory for data storage and/or data access. In some embodiments, virtually all multidimensional indexing and ordering related operations are performed through the use of in core memory. Because this use of in core memory tends to speed up the performance of the operations, this use of the in core memory is herein sometimes referred to as "in core acceleration." Some in core accelerated embodiments of the present invention maintain full persistent storage of the content on disk or a similar medium. In some embodiments: (i) virtually all disk operations are sequential (writing and reading data) and in the absence of large bursts virtually all disk read operations can be avoided; (ii) the persistent data are structured so that cleanup of data that fall out of the window is done operating on entire files; and/or (iii) deletion of a file only causes a write operation to the table of contents of the file system, so a disk delete operation is amortized typically over millions of records. Through in core acceleration, the throughput is determined by the sequential write throughput of the persistent storage system (in our case several hundred MB/s) rather than by the latency (several milliseconds per record, which limits throughput to less than 1 MB/s for typical time series).

As used herein, the term "insertion optimization" may include one, or more, of the following specific types of optimization: (i) data persistency (virtually no data loss in case of a full power outage for example); (ii) ingestion is not limited by disk latency; (iii) optimal insertion ordering of data (for example, for time series data, which is generally indexed by the "time series identifier," such as a sensor id, as well as the time stamps, multiple parameters influence the optimal ingestion order for a given time series database); (iv) grouping insertions by time series identifier (thereby allowing a single lookup of the time series identifier which can be amortized across several insertions; (v) inserting the elements within a group in ascending order with regard to the time stamp; and/or (vi) grouping of data in the "database structure" (for example, some commercially available time series databases use "containers" to package each subset of time series data on the persistent medium).

Further with respect to item (iv) in the previous paragraph, the amortized lookup costs are roughly C/N, where C is the cost of an identifier lookup and N is the number of records added under this lookup, so that a moderately sized group gives already the majority of the benefit.

Further with respect to item (v) in the list two paragraphs previous. In embodiments where the data have to be searchable with respect to time, the database tries to order data in this dimension when writing to disk or another persistent medium. Presenting data in the correct order (as described in item (v), two paragraphs previous) allows the database to write data sequentially in the vast majority of instances which is significantly more efficient.

Further with respect to item (vi) in the list three paragraphs previous. In some embodiments, once an identifier is associated with a container, all other records for this identifier will go to the same container. Thus, grouping the "identifier groups" by container consistently (even after a restart after a system failure) increases the sustainable throughput for insertion.

Ingestion optimization reorganizes data with respect to these parameters specific to the underlying times database system. In case of one commercially available time series database, sustained ingestion throughput increases by more than one order of magnitude when using the above described specific types of "ingestion optimization," as compared to unoptimized insertion.

The rest of this Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: stager sub-system 102; client sub-systems 104, 106; time series database sub-system 108; sensor sub-systems 110, 112; communication network 114; stager computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Figure 2:
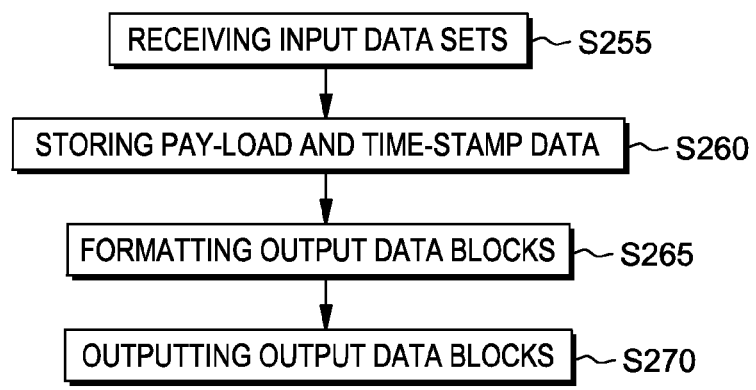
FIG. 2 is a flowchart showing a first embodiment method performed, at least in part, by the first embodiment system.
Figure 3:
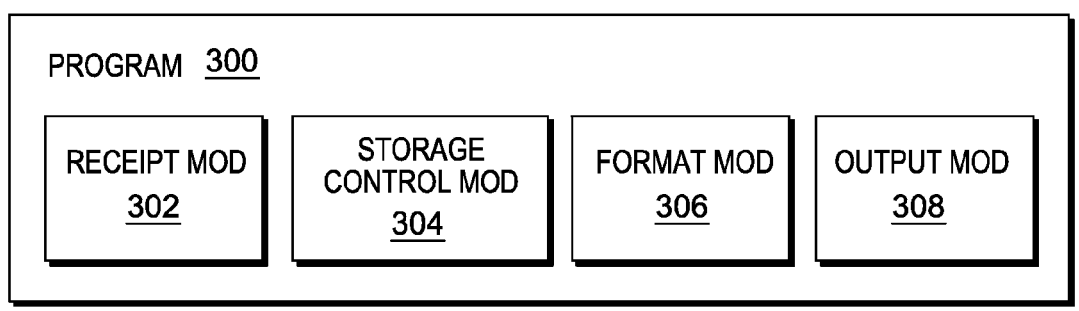
FIG. 3 is a block diagram view of a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where receipt module ("mod") 302 of program 300 of stager computer 200 receives input data sets, with each input data set including payload data and a timestamp related to collection of the payload data. The form and format of these input data sets will be further discussed, below, in the Further Comments And/Or Embodiments sub-section of this Detailed Description section. These input data sets are created at sensors 110, 112 (see FIG. 1), and then sent to one of the client subsystems 104, 106 over communication network 114, from where they are sent to receipt mod 302 of stager computer 200 (see FIG. 1). These input data sets come in on an on-going basis, such that receipt of these input data sets will continue as later steps S260, S265 and S270 are performed. Sometimes these input data sets will be received in data bursts. Sometimes these input data sets will be received in a different time order than the order that would be indicated by their respective timestamps. This embodiment processes the input data sets so that they can be smoothly ingested into time series database 108 (see FIG. 1). This processing will be described in connection with the other steps of flow chart 250.

Processing proceeds to step S260, where storage control mod 304 stores the payload data and associated time stamps to persistent storage 210 (see FIG. 1). The storage occurs on an on-going basis, such that storage of newly-received input data sets will continue as later steps S265 and S270 are performed.

Processing proceeds to step S265, where format mod 306 formats the payload data and associated time stamps into output data blocks having a form and format suitable for ingestion into time series database 108. More specifically, these output data sets have a container/block structure, as is currently conventional for conventional time series databases. The formatting is performed on an on-going basis, such that storage of newly-received input data sets will continue as later step S270 is performed. However, the formatting of step S265 should be performed in a manner that accounts for out of order received data. More specifically, before a given output data block is formatted at step S265 enough time should have passed so that it is reasonably insured that none of the newly-arriving input data sets has a timestamp sufficiently early in time such that it should have been included in the output data block that is being formed and formatted. Accordingly, formatting step S265 is performed according to a sliding time window so that a given data block will include the oldest data (at the leading edge of the time window) and newer data with associated timestamps going forward in time up to a trailing edge of the sliding time window. This trailing edge of the sliding time window should be sufficiently in the past (relative to a present time) so that it is reasonably assured that no input data sets with timestamps earlier than the trailing edge are received after the output data block is formed.

Processing proceeds to step S270, where output mod 308 outputs the output data blocks after they are formed at step S265. More specifically, the output data blocks are output to time series database 108 over communication network 114 (see FIG. 1). Because the output data blocks are created according to a sliding time window, they will also be output at a timing according to that sliding time window.

III. Further Comments and/or Embodiments

Some embodiments of the present invention recognize the following facts, potential problems and/or potential areas for improvement with respect to the current state of the art: (i) without preprocessing, the arrival of live sensor data at a time series database (that is, the "acquisition") is determined by the time a sensor takes to perform a measurement or observation and/or by a transmission delay; (ii) for any sensor type, the acquisition is affected by variability arising from sources such as variability in clock skew and different data times to perform the measurement; (iii) additional variability is introduced by the data transmission from the sensor to the collecting database; (iv) data may arrive out of order or some sensors may be delayed more than the typical measurement interval (v) measurements may arrive at variable rates (for example, when a special event occurs); (vi) in the example of smart meters in an electric grid, a "last gasp" message can occur in the case of a power outage that causes bursts of sensor data to arrive outside of the regular schedule; and/or (vii) even the data arriving perfectly synchronized and in order are hard to digest for time series databases because one value arrives for every sensor for every "time slice" (that is, a predetermined, short duration time interval).

Further with respect to item (vii) in the previous paragraph, conventional time series databases perform poorly when ingesting slices of a duration that will herein be called "width 1." Tests with a conventional time series database, which specializes in the handling of time stamped measurement data, have shown that for a typical single-system database instance the ingestion of records that arrive in slices of width 1 is limited to about 1000 records per second on the average. Other conventional databases were tested in similar configurations and did not perform any better. The present disclosure recognizes that one of the key problems is the fact that each record requires a key lookup and I/O (input/output). To avoid this, AMI (Advanced Metering Infrastructure) systems typically gather larger amounts of data (for example, the records for an entire day). These records are pre-processed in a single batch and formatted for easier ingestion by the database and then loaded in bulk. Thus, it takes many hours until first queries can be performed against this pre-processed, batch data.

Some embodiments of the present invention recognize the following facts, potential problems and/or potential areas for improvement with respect to the current state of the art: (i) deployment of large numbers of sensors (for example, smart meters) that deliver measurements pose a challenge in processing time series data; (ii) in one project involving smart meters, there were customer requests to deal with tens of millions of smart meters that produce a time series of measurements each (for example, every 10 to 15 minutes for a "planned reading" and in large bursts during events (for example, in case of a power outage); (iii) the type of data mentioned in the foregoing items needed to be ingested (for example, 150 million records in one hour, amounting to up to 250 GB (gigabytes) of data); (iv) it can be desirable to have a capability to perform searches with short turnaround, minutes or seconds after new data arrives (for example, for outage location purposes in a smart meter system); (v) there exists a conventional time series database product for handling the type and quantity of data addressed in the foregoing items, but the ingestion rates for direct ingestion of "slices," as they arrive, was limited to about 1000 records per second on a time series database instance; and/or (vi) ingestion solutions gather data, presort them and then perform bulk loading on reorganized data to increase throughput, but this causes the time between arrival of a "measurement slide" (for example, the readings from 3 pm, to be unavailable for queries for 6 to 12 hours.

Some embodiments of the present invention may include one, or more, of the following features, characteristics and/or advantages: (i) provides an extension of a conventional time series database that allows more than 15,000 records per second sustained ingestion into the database on a single database instance across tens of millions of sensors; (ii) provides an extension of a conventional time series database that allows a peak absorption rate of 1 million records per second on a single database instance; (iii) a slice of 10 million meter readings is available for queries about 2 minutes after arrival and for a "time window" (for example, 6 hours) 100,000 remote queries per second are possible while maintaining full ingestion speed; (iv) data security is provided such that in case of a power outage only about 4 KB (kilobytes) of data are lost that are "in flight" on the network interface; (v) even the minimal data losses mentioned in the previous item can be avoided by double buffering on the feeder side; and/or (vi) the reverse problem can be addressed, playing back time series data over large sets of sensors at high rates (limited by the delivery capability of the time series database back end).

Some embodiments of the present invention may include one, or more, of the following features, characteristics and/or advantages: (i) provides a time series data store (or "pre-processing store"), and associated staging machine logic (also referred to as a "stager"), that operates as a pre-processor to a time series database (also referred to herein as a "time series database backend," or a "time series database backend instance"); and/or (ii) the pre-processing store receives data via a proprietary driver on a network port and holds data in a time window that is configurable (within limits, such as limits caused by the data storage capacity of the system).

In some embodiments of the present invention, the pre-processor store and stager may perform one or more of the following functions: (i) decouple ingestion rate (how fast data arrive which can be highly variable, hundreds of thousands per second) from the ingestion capability of the time series database backend instance (which is highly variable itself, rates can vary between 0 records per second during consolidation phases to ~2 k/second) across very large key sets (10 million and more); (ii) index data by sensor id (identification code) and time to allow queries at a high rate (100 k basic queries per second); (iii) feed the data in an optimized order (by time and correlated with database containers) to the time series database backend instance; (iv) potentially feed multiple time series database backend instances (for example, 5-10 instances) in parallel; (iv) the "player" component performs the inverse function, in that it retrieves blocks of time series data (for example, a two (2) million meter subset out of a ten (10) million meter database) and provides them in the order of their time stamps (for example, to drive simulation or machine learning; (v) can process data from 5-10 time series database backend instances on a single "player instance;" and/or (vi) multiple stagers/players can be combined via partitioning networks in conventional software for providing a stream computing solution to enable real-time analytic processing of data in motion.

Some embodiments of the present invention may include one, or more, of the following features, characteristics and/or advantages: (i) capability to ingest bursts at a rate of more than 1 million records per second and 100 Mb per second on a single network interface on a single conventional computer system; (ii) make records available for queries at a rate of more than 100 thousand records per second; (iii) optimize the insertion of records into a conventional time series database to achieve more than ten (10) times higher average throughput than with direct ingestion of the records; (iv) a single stager can ingest data for multiple time series database instances; and/or (v) use of multiple time series database instances can achieve roughly two (2) orders of magnitude higher sustained throughput on a single "point of entry" compared to using a single time series database directly. Further with respect to item (iv), a database instance typically uses one (virtual) machine with several processor cores and disks. Depending on the data schema, scalability in a single instance stops at some point.

The components and use models of embodiment(s) of stager(s) for a time series database, and the algorithms and techniques behind the stager(s), will now be discussed in the remainder of this Further Comment(s) And/Or Embodiment (s) sub-section.

Figure 4:
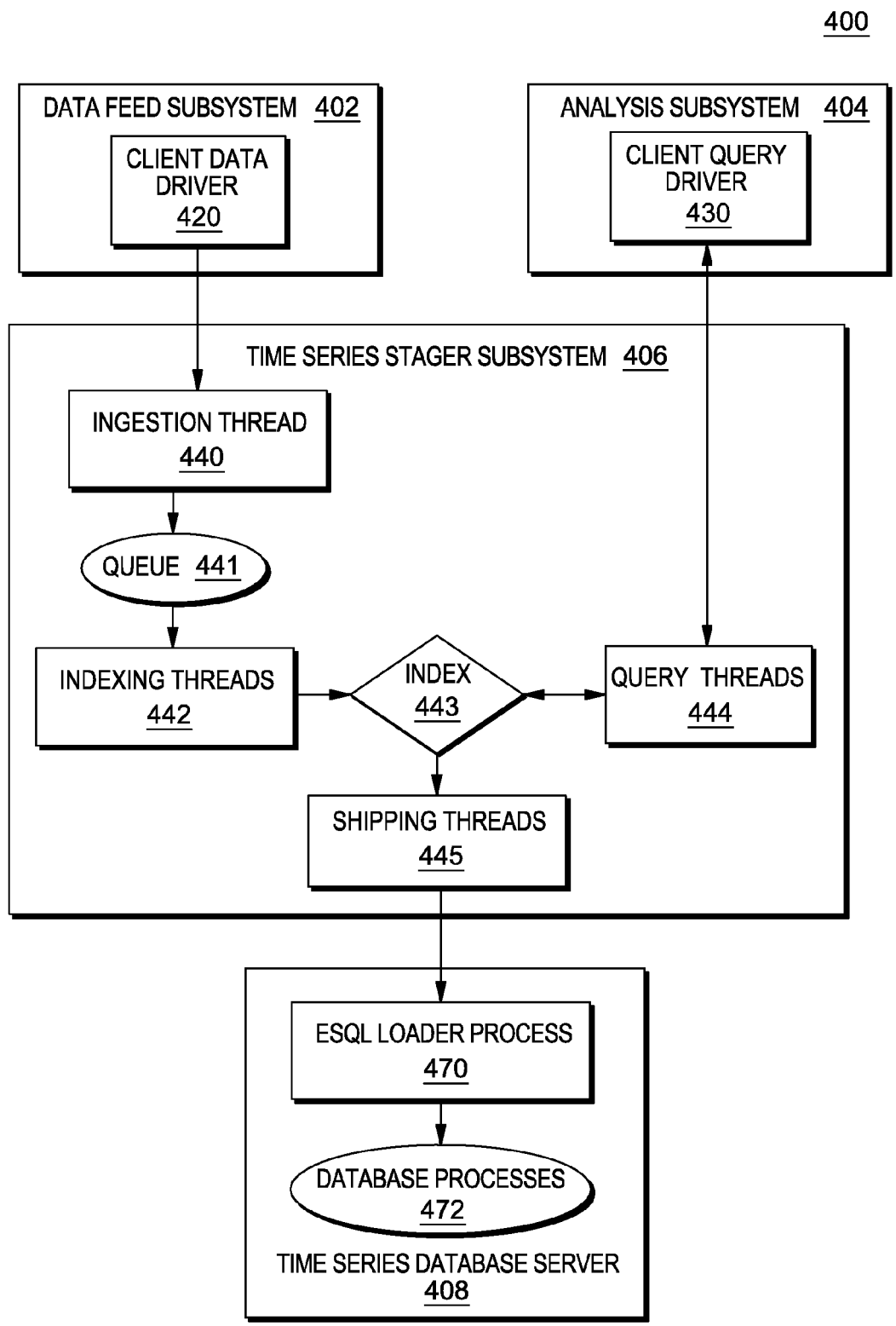
FIG. 4 is a block diagram view of a second embodiment of a system according to the present invention.

FIG. 4 shows time series database system 400 including: data feed sub-system 402 (including client data driver module ("mod") 420); analysis sub-system 404 (including client query driver mod 430); time series stager sub-system 406; and time series database server 408. Time series stager sub-system 406 includes: ingestion thread 440; queue 441; indexing threads set 442; index 443; query threads mod 444; and shipping thread mod 445. Time series database server 408 includes ESQL (enhanced structured query language) loader process mod 470; and database processes 472.

Data feed sub-system 402 uses the client driver data module to communicate a data feed to time series stager sub-system 440 through a dedicated dual-port network connection. Every data block of this data feed (not separately shown) includes: a time stamp, and source identification data (for example data indicating identification of a particular sensor and a tuple of values associated with the sensing activity of that sensor). The data types of identifier and values follow a schema that matches the database schema for the time series.

Ingestion thread mod 440 receives the tuples and saves them in a disk-based queue 441, such that, in case of a system failure, data loss is avoided. In this embodiment, the queue employs a caching scheme to minimize disk accesses, typically only record, write and bulk deletion accesses are required. Only if a very large data burst arrives that exceeds the cache capacity, records may have to be read from disk for further indexing.

Indexing thread(s) 442 takes items from the queue, using adaptive synchronization to ensure high throughput without data being "stuck" in the queue if only a few records arrive.

The data items are added to the index where they are fully indexed across the sensor ids and partially ordered across the time domain. The content of index 443 slides through time and guarantees that at least all data in the specified time interval of the sliding window (for example, the last 6 hours) is present in the index for queries (that is query threads mod 444) by analysis sub-system 404. An application that performs analytics based on the data stream (not separately shown) can use client query driver 430 to establish a connection to time series stager sub-system 406 via a dual port network connection and submit "range queries" (for example, "find all records for sensor 'X' between times A and B").

Query threads mod 444: (i) receives queries from the network (via analysis sub-system 404); (ii) locates the appropriate data in the index; and (iii) returns data sets that satisfy the respective queries. Shipping thread mod 445 parses index 443 once sufficient data have accumulated. It orders the data fully along the time domain and groups "sub-timeseries" optimized for the container structure of the database system. These sub-timeseries are sent via a dedicated dual port network connection to ESQL loader process mod 470. Mod 470 runs on time series database server 408, and directly communicates with the database process to add the data to the time series database. In this embodiment, the time series database of database server 408 uses currently conventional software and data structures, but the data ingestion techniques of the present invention allowed ESQL loader process mod to be used, which is an advantage of some embodiments of the present invention. Some embodiments of the present invention may include one, or more, of the following features, characteristics and/or advantages: (i) the staging sub-system operates like a filter that resides between sensor data interface set (for example, a live meter data source) and time series database backend instance for ingestion; (ii) the client driver includes a C++ library and a few header files which provide an API (application programming interface) to: (a) open a dual-port TCP (transmission control protocol) socket to the staging engine, and (b) assemble binary data packages for individual sensor records coming from the sensor data interface set; (iii) the query driver is a C++ library and a few header files that facilitate: (a) posing queries to the staging engine, and (b) retrieving answers; (iv) a single query driver can connect to one staging engine via a pair of TCP sockets; (v) the staging engine is an application program that runs multiple threads in a single process; (vi) the staging engine may, or may not, run on the same computer as time series database backend instance; (vii) the staging engine 426 includes four (4) physical CPU (central processing unit) cores; (viii) the pre-processing store includes sufficient memory to store an amount of data expected, at maximum, to be received within a configurable, predetermined "sliding window" (for example, a sliding window configured to be twelve (12) hours long); (ix) the staging engine "listens": (a) on a pair of ports for a connection from the client driver, and (b) on another pair of ports for a connection from the query driver; and/or (x) the staging engine opens a connection through a pair of ports to the ESQL loader.

Some embodiments of the present invention may include one, or more, of the following features, characteristics and/or advantages: (i) the ESQL loader takes the form of an application that runs, for optimal performance, on the same computer as time series database backend instance; (ii) the ESQL Loader listens on a pair of ports for a connection from the engine and receives a prepackaged subtimeseries (for example, these may be added to a database instance via the ESQL loader); (iii) a TSS sensor collection creation tool in the form of a single application that creates all necessary tables, calendar artifacts and containers expected by the ESQL loader; (iv) a single configuration file (further discussed, below) specifies the data schema for a sensor collection and is expected by the applications; (v) each record of the single configuration file consists out of a primary identifier for a time series, a time stamp and a variable number of fields with data; (vi) the records of a single primary identifier is a time series; and/or (vii) the data is delivered to a database backend instance in a fashion that maximizes the loading throughput.

Data ingestion is the process of absorbing data one record at a time with minimal requirements on the order. The client driver provides an API that allows packaging one, or multiple, records into a binary format which matches the schema in the configuration file "one by one." Binary packages are then sent via network to the stager. A running instance of the stager expects exactly one client driver to connect to it over the network, but multiple connections can be realized by using multiple ingestion threads. The behavior of the stager is largely determined by the width W of the sliding window that the stager obtains as a parameter at startup. This width is a time interval and the stager will hold at least all records that fall into the time interval of width W that ends with the time stamp of the last indexed record. It also ensures that every record that is not in the sliding window is in the database.

Data variability will now be discussed. Data arrives roughly in slices, one record from each sensor. Given a set of sensors S1, S2, . . . , Sn, an ideal slice will be a set of n records, one for each sensor, with time stamps within a small time interval that all arrive within a similarly small time interval with a small delay (for example, for a slice of meter data they all have a time stamp of 3 pm and arrive between 3:01 pm and 3:03 pm). However, in practice the data may be irregular, arrive out of order and may miss records or have additional records (for example, from last gasp messages on smart meters). Some possibilities that can cause difficulties will now be listed: (i) the time of arrival may be in a different order than the order of the time stamps (for example, records for S1 and S2 may arrive at t1 and t2 with t1<t2, but may have time stamps t2<t1); (ii) there may be multiple records arriving for a sensor T1 within a very small interval; (iii) within the records for a single sensor, it is not guaranteed that they arrive in order (that is, records S1:t1 and S2:t2 with t1<t2 may arrive such that S1:t1 arrives after S2: t2); (iv) latencies can be quite large, even larger than multiple intervals between target read times (for example, a communication path may be blocked so that the data remains buffered at some stage and arrives an hour later when network connectivity is restored); (v) data may be missing (that is, an expected measurement for a target read time for a given sensor may never arrive); (vi) the meter identifiers are not necessarily known up front (for example, records for unknown sensor identifiers should be properly stored and new time series for these identifiers should be created); (vii) the stager deals with delivery variability; (viii) multiple records for one key are delivered as a group to minimize key lookups and I/O operations; (viii) records within a sequence of groups for a primary key are delivered in order of the time stamp if they fall within W/2 (this is further discussed, below); and/or (ix) groups of records are delivered in an order that minimizes container access in the database.

Impedance mismatch will now be discussed. Any database has a response behavior for the ingestion of data. There is an upper bound for throughput that cannot be exceeded. The database will typically sustain an average throughput of ingested records per hour, but the ingestion rate on a finer granularity (for example, per second) can vary dramatically. It is not uncommon for a single ingestion to take many seconds while the average time for ingestion is less than $\frac{1}{1000}$ of a second. A live data stream has its own characteristics. Data may not arrive continuously, but in bursts (for example, for smart meters it is desirable to have all meters read at roughly the same time since it gives a more precise snapshot of the state of the grid for analytics than staggered reads). If a large event occurs, sensor data can arrive in large bursts reporting exceptional status changes (for example, last gasps). It is desirable to not buffer too much in the communication lines since the data is useful for status assessment and delayed delivery may cause them to be trapped or lost by the power outage. The stager provides elasticity to deal with this impedance mismatch. Specifically: (i) it will have the capacity to absorb records at a very high rate (two (2) orders of magnitude larger than the average database throughput) for some amount of time; and (ii) it will mask times in which the database cannot absorb data (for example, if it is blocking for an hour due to maintenance).

Data safety will now be discussed. The stager commits the ingested data immediately to disk, even at the highest burst rate, before they are indexed in memory to allow queries. For a conventional computer with battery buffered RAID array data loss in case of a power failure or other outage that does not affect the RAID integrity, data loss will be limited to a few kilobytes. The stager provides a recovery capability. It is possible to restart and reinitialize the stager from the committed data to get the in-memory facility back to the state when the system failed.

An embodiment of a deployment concept will now be discussed. In the first iteration, the stager will be its own application, running as a multithreaded process that communicates via TCP connections. It will have three network interfaces that use two (2) dedicated network ports each. The stager will interact with the database via a dedicated TCP connection. On the database side, running on the database system, is the ESQL loader that receives records from the stager pre-organized for ingestion. The ESQL loader will act like a "server" (that is, it is started and waits for a stager to connect). Stager instances can disconnect and reconnect, but this has a performance impact (that is, the stager acts in this direction as a "client." The stager engine acts like a server itself, allowing connections on two (2) pairs of network ports: (i) one for data ingestion; and (ii) the other for queries (on an ingestion instance). Thus, a stager instance can be started and connected to a database-instance that runs the appropriate stager driver. The stager driver is a process that runs on the same system as the database. It interacts with the database through ESQL and the TSL API (time series layer application program interface). Exactly one stager instance can be connected to one driver process, but multiple drivers can be connected to one stager process. The stager is started and from then on "listens" to connections. An application can connect utilizing a C++ driver stub. (Note: the term(s) "Java" may be subject to trademark rights in various jurisdictions throughout the world and are used here only in reference to the products or services properly denominated by the marks to the extent that such trademark rights may exist.) A stager instance allows exactly one application connection at a time for data flow. An ingestion instance will allow a single dedicated connection for queries. A service layer can multiplex multiple http (hypertext transfer protocol) client connections to this dedicated high performance connection.

Time series schema will now be discussed. Because there are multiple components involved, the data schema is controlled through a configuration file that is accepted by all components and utilities. Here is an example:

| MeterData | |
|---|---|
| string64 | meterid |
| int32 | |
| status | |
| float32 | value |

The first line contains a single string (with no "space" characters) which denotes the table name. Each table holds an irregular time series. The second line is the type and name of the master key under which a time series is stored. The master key is equivalent to a link to a table whose primary key is the time stamp. The following lines are the types and column names stored with each time stamp. Available types are: (i) string (limited length to 32 characters); (ii) int32; and (iii) int64, float 64. Some embodiments may also allow a "binary blob" type to be used. In this embodiment, this configuration file is required to start the stager instances, drivers and utilities as well as the streams operators.

Time series creation will now be discussed. All the tables, containers and calendar artifacts necessary to support usage by an ESQL loader instance can be created via a software tool which accepts a schema configuration file and database connection parameters. They can also be created manually. The artifacts and naming conventions will be discussed in the following paragraph.

All the artifacts follow a naming convention around the "base name," which is the first string in the schema configuration file. For example: (i) calendar pattern basename_calpat; (ii) calendar basename_cal; (iii) containers basename_c0 to basename_c999; (iv) row type basename_rowtype; (v) time series table basename_tab; (vi) virtual table basename_vtab and default container basename_cdef; (vii) time stamp tstmp; and (viii) primary key basename_id. The utility will create an irregular time series.

Java utilities will now be discussed. In this embodiment, the following utilities are available, in the form of Java programs: (i) a "create table" utility creates an irregular time series as defined by the configuration file in the database that is defined by server ip (internet protocol) address, time series database backend instance and database name; (ii) a "print table" utility prints the content of a time series table based on the same arguments as given to creation; (iii) a "drop table" utility removes the time series table and all auxiliary constructs as row types. In this embodiment, these utilities match the ESQL-based utilities.

A Java interface will now be discussed. The Java interface uses the JDBC driver of the time series database backend instance and the VTI (virtual table interface) to present a time series table as a conventional relational table. The conventional relational table (made possible by the Java interface) encapsulates the time series capabilities as follows: (i) connecting to a database and disconnecting; (ii) creating, printing and dropping a time series table; (iii) AddTableSlice adds a list of time series entries across multiple meters. Two types of timestamps are supported when adding slices as follows: (i) epoch time in microseconds; or (ii) a time string formatted in a manner defined by the time series database backend instance. The epoch time variant may be preferable in some applications because it is faster and more robust with regard to time zones, etc.

Currently a single query is available that extracts the subset of a time series for a given master key and a time interval. The QSingleTS method accepts the "table spec," a "master key" and a time interval in Unix epoch time in microseconds and returns a list of entries that match the filter criteria. A conventional javatest class provides an example on how the interface can be used, including the creation of a SWETableSpec class instance from the configuration file which is the mechanism that communications the specification to the Java interface. The utilities mentioned above are subsets of this test.

The streams interface will now be discussed. The client driver can be used to implement streams sink operators. The code in uts_MDataClientFeeder.C shows the use of the interface. There is also a Java interface that uses JDBC and the VTI with lower performance. Relevant code is as follows:

```
composite MeterSliceInfSink {
    graph
        stream<metd.utils::MeterSlice slice> SLI = Import( ) {
            param
                subscription : label == "meterslice";
        } // end import //
        ( ) as InformixSliceStore = JavaOp(SLI) {
            param
                className: "insert appropriate HTTP address here";
                classLibrary: getSubmissionTimeValue("classpath"),
                getSubmissionTimeValue("ifxjar");
                server: getSubmissionTimeValue("server");
                port: getSubmissionTimeValue("port");
                dbname: getSubmissionTimeValue("dbname");
                instancename: getSubmissionTimeValue("instancename");
                userid: getSubmissionTimeValue("userid");
                pwd: getSubmissionTimeValue("pwd");
                specfilename: getSubmissionTimeValue("specfilename");
                batchsize: 1;
        }
} // end composite //
```

In this embodiment, the stream's interface is formed by a Java operator (Streams project METERDRAFT, composite metd.MeterSliceInfSink). The interface has the character of a template to some degree, a copy of the above code fragment and a definition for the SPL type MeterSlice and updated subscription label is sufficient to create a new sink. In this embodiment: (i) the composite subscribes to the stream with the label meterslice that provides a datatype metd.utils::MeterSlice; and (ii) the composite requires arguments that specify the database as well as a path to a configuration file (specfile).

With a given configuration file the utility can be used to create the time series in the database. Compiling the few lines of SPL code with a redefined version of the metd.utils:: MeterSlice streams tuple that matches the spec file and passing the database location and spec file to the operator when started is sufficient to establish a sink operator into the time series. The meterslice type is a list of records, each record being a tuple (seemetd.utils/CommonTypes.spl) for our current meter data format. In this embodiment, the regression test maintained at an HTTP address provides a complete example on how to use the streams adapter appropriately formed and/or formatted for the time series database backend instance. Data inserted through this mechanism can be queried through the Java interface or of course through the SQL interface of the time series database backend instance. This can be done more elegantly as a template with runtime definable label, which is part of the stager in some embodiments.

Requirements and limitations, for the embodiment under discussion, will now be discussed. The historian functionality requires an instance of the time series database backend (with time series support). Running the loader and utilities requires the ESQL libraries, either through the client SDK (software development kit) or the database installation itself. The hardware requirements depend on the data characteristics as follows: (i) 4 CPUs for the four (4) threads of the staging engine (alternatively, depending upon synchronization costs, there may be embodiments with more threads for queries, ingestion, indexing and shipping); (ii) the amount of RAM needed depends on the number of keys, size of the records and the depth of the time window and the expected maximum number of records that will be received in the time window; and (iii) disk capacity depends on "burst absorption" capacity (for example, a prototype embodiment was able to absorb 100 MB/s onto a RAID array with a single compute node—average throughput required for four (4) readings per hour across 100 million meters is 8 MB/s with 50 byte net payload per record. A second RAID is required for holding organized data on the disk.

With respect to item (ii) in the previous paragraph, an estimate for 100 million meters and roughly 100 records with 50 bytes net payload is 1 TB (terabyte) to hold the entire window in RAM with index. Some embodiments may allow holding a large part of the data on disk with a moderate impact on throughput and larger impact on queries. A prototype showed that operation is possible with 100 GB RAM for that scenario.

Algorithms and techniques, used in the embodiment under discussion, will now be discussed. One technique, and associated algorithm, is a pipelined thread layout. The time series stager component that performs the actual reorganization of data and query support, which is basically an in-core key-value store, uses at least four (4) threads as will be respectively discussed in the following four paragraphs.

The absorption thread reads data from the network interface and writes them immediately to disk in a binary format. This data includes all data that is not committed to the time series database backend instance, yet is present in the on-disk data. In this way, the data written by the absorption thread provides recovery capability. The absorption thread also maintains a small in-core buffer with the most recent data. The combination of the in-core buffer and the data on disk together with a pthread mutex forms the indexing queue and synchronization between the ingestion thread and the indexing thread. As those of skill in the art will appreciate, a pthread mutex is a construct in the pthread library, which represents a common way to write multithreaded programs in C/C++. A mutex is an object used for synchronization between parallel thread.

The indexing thread takes data from the indexing queue and stores it in the in-core dictionary. The dictionary is implemented as a "red-black tree" with one node per primary key. Each node contains a data structure for the organization by time, which is discussed later. Synchronization of access to the in-core structure is handled via read-write mutices.

The shipper thread is triggered by the indexing thread via conditional variables. The shipper thread traverses the indexing structure, encodes information, and sends it over the network to the ESQL loader process. The details of synchronization and format are discussed later.

The query thread "listens" on a network interface for queries from the query driver and performs searches in the in-core data structure to assemble the response. The response is sent back to the query driver.

Data can be partitioned via a hash function in the absorption thread and parallel chains of threads can process data from ingestion queue all the way down to the shipper thread. On one conventional computer, which includes twelve (12) CPUs, 3 to 4 parallel chains should be effective. On another conventional computer, which includes forty (40) physical cores, it may be possible to use up to ten (10) chains before the absorption thread begins to act as a "bottleneck."

Because the indexing throughput is about one order of magnitude higher than the database ingestion rate, each shipper thread may drive multiple instances of the combination of ESQL loader and time series database backend instances on a separate system, allowing effective parallelization of the ingested data across 50 to 100 database systems, depending on the data schema.

Data encoding and communication will now be discussed. Discussion will begin with a discussion of dual port network links. A key operation on the network for the time series stager is a "round trip" (for example, for a query). The round trip operation includes the following steps: (i) task A sends a request via a TCP socket to task B; (ii) task B receives and decodes the request, computes a response and sends a response back to task A; (iii) task A performs a write or send operation on the socket; (iv) task B performs a read operation, computes the response and returns it with a write or send operation; and (v) task A performs a read operation. As the process continues, typical network code establishes a socket connection and then performs the following set of operations: (i) to avoid overhead, the connection is maintained as "established" over a large number of interactions, but on a fast network interface with the stager and database on the same switch, the time for a round trip in this mode can still take as much as 1 millisecond; (ii) the in-core data structure can find the data for a given sensor and extract for example the last 10 data points and encode them in less than a microsecond when operating on a set of 10 million sensors, so the communication overhead increased query latency by more than 2 orders of magnitude. This also limits maximum query throughput by the same factor. The maximum number of queries per second on a single "query handling thread" is about 1000 queries per second. Using more threads does not improve the situation much since it introduces additional synchronization overhead when accessing the in-core structure.

Further examination showed that the bulk of the overhead resulted from the inversion of the direction of communication from A to B and then back to A. The problem can be addressed by using two network ports and a persistent connection so that each TCP socket is only used in a unidirectional manner. This reduces the average time for a round trip to about 10 microseconds or a sustained query throughput of 100,000 round trips per second for data packages that do not exceed 512 bytes. For certain package sizes on the round trip, larger delays were still observed. A mostly uniform round trip time was achieved by running all sockets with TCP_NODELAY.

Hybrid bytefields will now be discussed. A further challenge for performance is the fact that the data types and number of columns in sensor records are not known at compile time and for certain data types as strings the size required to store the data may vary from record to record. Obviously a string based encoding is too costly for the throughput levels the stager handles, so a binary format was used that encoded/decoded numbers in "network order" to allow exchanges between systems with different "endianism." It proved to be cumbersome to use arrays to accumulate the data for a response (or similar operations) because it is often difficult to predict the size of a data package, in particular when the type has to be resolved at runtime. A hybrid data structure consisting out of a linked list of fixed size arrays was used for the purpose of implementing these "netorder bytefields." The structure allows you to incrementally build bytefields of arbitrary size byte appending data field-by-field. Inversely, the data are decoded destructively, deconstructing the bytefield as data are pulled off. Because an operation on a link, which is expensive relative to an array access, has to be performed only N bytes, the overhead can be dialed in to optimize throughput. Using 64 or 128 bytes per link delivered the desired performance and avoided the frequent allocation/deallocation of larger arrays, which causes heap fragmentation.

Raw Bytefields will now be discussed. To keep the actual indexing structure agnostic of the data schema, data are organized into three components: (i) a raw bytefield for the primary key that identifies the time series; (ii) a 64-bit integer for the time stamp of a record (the time stamp is stored in microseconds since the epoch); and (iii) a raw bytefield that contains the remaining data fields of the records.

A raw bytefield is a data structure that allows the encoding of varying data as for example strings, 64-bit and 32-bit integers and 64-bit and 32-bit floating point numbers in a platform specific format. It is more limited than the netorder bytefield in its functionality, but more efficient for the tasks that it can perform. Its size has to be known during initialization. It does not deal with varying binary formats between platforms, such that it should not be used for network communication. It behaves like a pointer to memory, so that tracking of ownership and cleanup has to be performed by the code that uses it via the provided methods. The code using the bytefield has to know the types stored and their sequence.

A raw bytefield is a 16 byte buffer. The first four (4) bytes hold the length of the bytefield, and the rest either holds data or a pointer to a block of memory. It provides methods to append data of different types at a position (which return the new end position) and methods to read data of different types at a position (which return the position after the data just read). Thus, a bytefield can be sequentially constructed and sequentially parsed. A comparator for use in the red-black tree that is independent of what is stored in the raw bytefield is also provided. Raw bytefields are used for almost all internal data representation due to their generality and efficiency. In the embodiment under discussion, netorder bytefields are used for all network communications.

The ingestion queue, of the embodiment under discussion, will now be discussed. The ingestion queue provides the functionality for two tasks, burst absorption and buffering data for the indexing thread. The ingestion queue has an on disk and an in memory component. Through the use of an on-disk component, incoming data is written to disk, using a small asynchronous buffer of 4 KB. Thus, on a battery buffered RAID array, data loss should be limited to the amount in the asynchronous buffer. The data is organized in files. The size of the files adjusts dynamically based on the amount of data that is held on the stager. Each record in the stager has information on the "recovery record" for the file that holds a copy of the data on disk. Records are "inactivated" in the recovery record when they are committed to the database so that files with only inactive records can be removed.

The in-memory component is a queue protected by a lock. The absorption thread adds fields to the queue and the indexing thread removes fields from the queue. The maximum size of the queue is limited to a few MB (megabytes). Because the maximum throughput of the absorption thread can be significantly higher than the throughput of the ingestion thread(s), the on-disk recovery data are used to extend the capacity of the queue without requiring large amounts of RAM. One conventional computer can hold up to 6 TB (terabytes) of recovery data in its RAID array, such that large bursts can be handled. The transition between in-core queue and on-disk recovery data is managed by a system of iterators. As will be appreciated by those of skill in the art, an external algorithm for ingestion queue may also be used.

Indexing data structure, of the embodiment under discussion, will now be discussed. The indexing data structure is a specialization of a fully templated comparator based red-black tree. The key for the red-black tree is a raw bytefield that holds the primary key of the data schema (for example, a sensor id). The data type associated with the key is a bucket set.

Indexing synchronization, of the embodiment under discussion, will now be discussed. Because the stager minimizes the delay between arrival of a record and indexing of a record, each record is added to the ingestion queue immediately, requiring synchronization on the indexing queue mutex Mi. To avoid synchronization overhead on Mi, the indexing thread bundles retrievals from the queue adaptively as follows: (i) acquire Mi; (ii) obtain up to m records (in this embodiment, 1,000 records) from the indexing queue; (iii) release the lock; (iv) process the obtained records; and (v) if no records were found, sleep for a short amount of time (in this embodiment, on the order of microseconds). This varies the fraction of time the lock is held by the indexing thread depending on the throughput of ingestion. If throughput is high, only one lock acquisition per m records is required. Because indexing takes significantly longer than removal from the queue, the lock is typically held less than 1% of the time. Additionally, retrieval from the on-disk component of the indexing queue does not require the mutex to be held. Until indexing "catches up" and has to retrieve records from the in-core buffer, indexing can read from the files and only file position updates have to be exchanged between the threads. Conversely, if throughput is low, every record is indexed with a delay of (at most) the sleeptime period. For example, sleeping for one microsecond is sufficient to avoid that the indexing thread burns clock cycles when no data are available.

Bucket set and sliding window techniques, of the embodiment under discussion, will now be discussed. The time interval of the sliding window is partitioned into T equal time intervals of $\Delta$ in length. In this embodiment, T=4. A bucket set holds T+1 such interval in an array, the fifth current bucket reaching past the latest time stamp that was seen so far. Additionally, there is a singly linked list of buckets for records that are older than the oldest time covered by the sliding window when they arrive. The T+1 buckets covering (T+1)/T of the sliding window act as a ring buffer implemented on an array of size T+1. A continuous bucket counter is mapped via modulo operation to an array slot. Each primary key in the dictionary holds one bucket set.

Record arrival will now be discussed. When a record arrives, it is placed in a bucket based on its time stamp. If it falls into one of the T+1 time intervals corresponding to the current set of active buckets, it is placed into the appropriate bucket. If it is older than the older boundary of the current position of the window, it is placed in a special bucket for "outdated" records. If it is newer than the "current" bucket, the window moves.

A window move occurs when a record is encountered that is more recent than the later boundary of the "current" bucket. The move causes a progression in the ring buffer. Some buckets, typically just one, fall out of the array of T+1 into the linked list. New buckets are added at the front. All bucket sets in the dictionary move in unison.

Ship trigger will now be discussed. As soon as time (as observed by timestamps on incoming records) has passed one half of the specified window interval, a ship operation is triggered. It runs in parallel to further ingestion, reading the data in the ring buffer. Only one ship operation may be active, such that indexing is halted if a ship operation to the database takes longer than half of the specified sliding window time interval. This also assures that the buckets that are shipped remain in the ring buffer during shipping.

A bucket is a hybrid structure in the form of a singly linked list of small arrays. Buckets are the most frequently occurring element in the stager and the number of elements in a bucket is generally impossible to predict. A bucket may contain no elements, for example during an outage. A bucket may also contain a large number of records if there is multiple last gasp and re-start messages in addition to regular reads within the covered time interval. The hybrid structure minimizes the overhead for a linked structure while providing adaptive growth. A bucket stores a sequence of records in the order of their arrival. Each record holds a time stamp, the raw bytefield with the columns as well as a pointer back to the "recovery entry" for the file that contains a copy of the data. Additionally, it provides a capability to iterate through records and stores a marker in the form of an iterator through which shipping and indexing track which elements have already been shipped.

A "ship" (or "shipping") of records is triggered via conditional variables every time half of the specified sliding window interval has passed. Shipping has two phases: (i) a set of all new (not covered in any prior ship) primary keys is shipped first (they are accumulated during indexing in the order in which they arrive—this order and the set of keys are preserved for reuse when the stager is restarted; and (ii) a set of time series, one for each primary key that has new data, is shipped. The set of time series consists of the primary key and then a set of pairs consisting of a time stamp and a raw bytefield. It covers the time interval for which data is shipped and any records older than this that arrived with a delay larger than half of the sliding window interval. The time series are shipped in the order of the primary key lists. This allows maintenance of a correlation between time series augmentation and the containers established for the time series. Note that the mini-time series are sorted for shipping. If the sort method is "stable," the order in which records with the same time stamp arrived is preserved. For each record that is shipped, the counter in the "recovery tracker" is decreased using the pointer stored in the record. A recovery file reaching count zero is cleaned up. The completion of shipping is indicated via conditional variable.

Choreography will now be discussed. The multiple tasks performed by multiple threads in the stager are coordinated by regular mutices, read-write locks and conditional variables. A brief overview over the choreography between the different components and their interactions will now be set forth.

Note that currently keys will not be removed from the dictionary, even if they have been inactive for a while. In typical ingestion scenarios, key deletion is not required. Key deletion can only be performed when queries and shipper are inactive. In this embodiment, inactivity of the shipper is already tracked via a conditional variable. A "cleanup" phase can be added by expanding the following condition set: (i) organizer indicates desire for cleanup by setting the condition; (ii) shipper signals completion; (iii) query thread suspends if it detects "cleanup desired" and "ship inactive" and sets "query inactive;" (iv) organizer checks periodically (absorption loop) for "ship inactive" and "query inactive" if "cleanup desired;" (v) organizer performs cleanup and resets "cleanup desired," which causes the query thread to wake up; and (vi) organizer can schedule the next shipment.

TQmut is the mutex controlling the indexing queue. Ingestion thread adds records to queue, indexing thread retrieves records. No interaction with other mutices.

ELlock serves to protect the list of records that track the recovery files. The ingestion thread adds new files. The shipping thread decreases the count of "active" records in a file and deletes files where this count reaches zero.

Shp_lock serves to protect the conditional variable and a few data fields used to coordinate the interaction between shipper and organizer. The organizer changes the variable to trigger a shipment. When triggered, the shipper retrieves the ship specification and begins extraction and sending of mini time series. The organizer has to wait for the variable to change back, which limits how far it can "work ahead" to half of the specified sliding window interval. In this embodiment, the shipper needs to be inactive in order to perform any deletions of keys from the dictionary.

BSetMutex: (i) can be used because each bucketset contains a read-write lock; (ii) advancing the bucket mapping in a bucket set acquires a write lock for BSetMutex; (iii) adding a record to a bucketset requires acquisition of a write lock for BSetMutex; and (iv) extraction of records by a query requires a read lock for BSetMutex.

DictMutex: (i) is a read-write lock that co-ordinates access to the dictionary on the primary keys; (ii) insertion of a new key into the dictionary acquires a write lock; (iii) performing the dictionary search for a query requires a read lock for DictMutex; (iv) adding new keys to the "key order list" requires a write lock on DictMutex; (v) extracting new keys from the 'key order list' by the shipper requires a read lock on DictMutex; and (vi) extracting iterators to bucketsets from the dictionary (shipper) requires a read lock on DictMutex (note that it gathers a number of keys, then releases the read-lock on DictMutex and does the actual data transfer with BSetMutices for the individual bucket sets—this minimizes impact of shipping on further ingestion of new keys).

Further with respect to item (ii) in the previous paragraph, note that extraction of records from the indexing queue occurs in batches of varying size. If the necessity of key insertion is detected, the lock is held for the entire batch and all key insertions are handled first and the write-lock is released before the records are actually indexed. This minimizes overhead on this lock, if there is no new key in a batch, it is not acquired at all.

Further with respect to item (iii), in the list two paragraphs previous, the actual data retrieval from the bucketset only requires a read lock for the BSetMutex. Note that this does not allow for deletions without disabling queries first.

The ESQL Loader component reads netorder bytefields from a network interface, new keys first, then a sequence of "mini time series." The information is decoded and translated into SQL statements and string input to the Informix routine TSL_PUT and this is executed via the ESQL capabilities of the time series database backend instance. Care is taken that the buffer size and record number constraints between TSL_FLUSH operations are not exceeded. The network read, decoding and encoding typically require only the fraction of a CPU to saturate the database.

Some embodiments of the present invention may include one, or more, of the following features, characteristics and/or advantages: (i) accelerated playback in timestamp order; (ii) merging, ordering and packaging for network on "stager style" binary data; (iii) can be evaluated using a C interface directly working with binary data; (iv) use CAPI (Coherent Accelerator Processor Interface) with flash for accelerated stager persistence through flash memory, temporary tables and/or logging in flash; (v) CAPI with a field programmable gate array (FGPA); (vi) fast sorting and hardware supported sorting; and/or (vii) use of GPU (Graphics Processing Unit).

Some embodiments of the present invention may include one, or more, of the following features, characteristics and/or advantages: (i) provides in-core acceleration for a "sliding window" of most recent data; (ii) provides optimization of data for ingestion into a time series database backend instance; (iii) mitigates and/or eliminates unfavorable effects that can be caused by of out-of-order arrival; (iv) mitigates and/or eliminates unfavorable effects that can be caused by data bursts; (v) optimizes alignment with the block/container structure used by the database backend instance; (vi) does not require data compression and/or lossy data compression; (vii) does not require any alteration/filtering of the data.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
receiving, from a set of client data driver(s) and by a time series stager system, a plurality of input data sets designed for ingestion into a time series database, with each input data set including payload data and a timestamp related to collection of the payload data;
for each given input data set of the plurality of input data sets, storing the given input data set a data storage device in the time series stager system for at least a predetermined interval of time;
for each given input data set of the plurality of input data sets, outputting the given input data set to a time series database system in an order, relative to other input data sets of the plurality of input data sets, determined by respective timestamps of the plurality of input data sets;
for each given input data set of the plurality of input data sets, responsive to outputting of the given input data set, ceasing to store the given input data set in the data storage device of the time series stager system;
receiving, from a client query driver, by the time series stager system and at a first point in time, a first query;
performing the first query against input data sets stored in the data storage device of the time series stager system at the first point in time to yield first query results; and
outputting, by the time series stager and to the client query driver, the first query results.

2. The method of claim 1 wherein:
the receipt of the plurality of input data sets occurs through an ingestion thread operating in a processor(s) set of the time series stager system.

3. The method of claim 1
the outputting of the input data sets occurs through a shipping thread operating in a processor(s) set of the time series stager system.

4. The method of claim 1 wherein the outputting of the first query results occurs through a query thread operating in a processor(s) set of the time series stager system.

5. The method of claim 1 further comprising:
maintaining an index of current input data sets of the plurality of input data sets that are currently stored in the data storage device of the time series stager system;
wherein the performance of the first query includes checking the index to determine the first query results.

6. The method of claim 1 wherein:
the data storage device includes a non-volatile data storage medium; and
the storage of the plurality of input data sets is non-volatile type data storage.

7. A computer program product (CPP) comprising:
a computer readable storage medium; and
computer code stored on the computer readable storage medium, the computer code including instructions and data for causing a processor(s) set to perform at least the following operations:
receiving, from a set of client data driver(s) and by a time series stager system, a plurality of input data sets designed for ingestion into a time series database, with each input data set including payload data and a timestamp related to collection of the payload data,
for each given input data set of the plurality of input data sets, storing the given input data set a data storage device in the time series stager system for at least a predetermined interval of time,
for each given input data set of the plurality of input data sets, outputting the given input data set to a time series database system in an order, relative to other input data sets of the plurality of input data sets, determined by respective timestamps of the plurality of input data sets,
for each given input data set of the plurality of input data sets, responsive to outputting of the given input data set, ceasing to store the given input data set in the data storage device of the time series stager system,
receiving, from a client query driver, by the time series stager system and at a first point in time, a first query,
performing the first query against input data sets stored in the data storage device of the time series stager system at the first point in time to yield first query results, and
outputting, by the time series stager and to the client query driver, the first query results.

8. The CPP of claim 7 wherein the receipt of the plurality of input data sets occurs through an ingestion thread operating in a processor(s) set of the time series stager system.

9. The CPP of claim 7 wherein the outputting of the input data sets occurs through a shipping thread operating in a processor(s) set of the time series stager system.

10. The CPP of claim 7 wherein the outputting of the first query results occurs through a query thread operating in a processor(s) set of the time series stager system.

11. The CPP of claim 7 further comprising:
maintaining an index of current input data sets of the plurality of input data sets that are currently stored in the data storage device of the time series stager system;
wherein the performance of the first query includes checking the index to determine the first query results.

12. The CPP of claim 7 wherein:
the data storage device includes a non-volatile data storage medium; and
the storage of the plurality of input data sets is non-volatile type data storage.

13. A computer system (CS) comprising:
a processor(s) set;
a computer readable storage medium; and
computer code stored on the computer readable storage medium, the computer code including instructions and data for causing the processor(s) set to perform at least the following operations:
receiving, from a set of client data driver(s) and by a time series stager system, a plurality of input data sets designed for ingestion into a time series database, with each input data set including payload data and a timestamp related to collection of the payload data, for each given input data set of the plurality of input data sets, storing the given input data set a data storage device in the time series stager system for at least a predetermined interval of time, for each given input data set of the plurality of input data sets, outputting the given input data set to a time series database system in an order, relative to other input data sets of the plurality of input data sets, determined by respective timestamps of the plurality of input data sets, for each given input data set of the plurality of input data sets, responsive to outputting of the given input data set, ceasing to store the given input data set in the data storage device of the time series stager system, receiving, from a client query driver, by the time series stager system and at a first point in time, a first query, performing the first query against input data sets stored in the data storage device of the time series stager system at the first point in time to yield first query results, and outputting, by the time series stager and to the client query driver, the first query results.

14. The CS of claim 13 wherein the receipt of the plurality of input data sets occurs through an ingestion thread operating in a processor(s) set of the time series stager system.

15. The CS of claim 13 wherein the outputting of the input data sets occurs through a shipping thread operating in a processor(s) set of the time series stager system.

16. The CS of claim 13 wherein the outputting of the first query results occurs through a query thread operating in a processor(s) set of the time series stager system.

17. The CS of claim 13 further comprising:
maintaining an index of current input data sets of the plurality of input data sets that are currently stored in the data storage device of the time series stager system;
wherein the performance of the first query includes checking the index to determine the first query results.

18. The CS of claim 13 wherein:
the data storage device includes a non-volatile data storage medium; and
the storage of the plurality of input data sets is non-volatile type data storage.

* * * * *